United States Patent [19]

LaFleur et al.

[11] Patent Number: 5,258,230
[45] Date of Patent: Nov. 2, 1993

[54] HIGH GAS BARRIER CO-EXTRUDED MULTIPLAYER FILMS

[75] Inventors: Edward E. LaFleur, Warminster; William J. Work, Huntington Valley, both of Pa.

[73] Assignee: Rohm and Haas Company, Philadelphia, Pa.

[21] Appl. No.: 878,099

[22] Filed: May 4, 1992

[51] Int. Cl.$^5$ .................. B32B 27/36; B32B 27/08
[52] U.S. Cl. .................. 428/412; 428/473.5; 428/476.8; 428/476.9; 428/483; 428/516; 428/518; 428/520; 428/910; 428/2
[58] Field of Search ............... 428/516, 518, 520, 483, 428/412, 473.5, 476.3, 476.9, 910

[56] References Cited

FOREIGN PATENT DOCUMENTS

180191A1 10/1985 European Pat. Off. .
91/3112652 12/1991 European Pat. Off. .
1591424 6/1981 United Kingdom .

*Primary Examiner*—P. C. Sluby
*Attorney, Agent, or Firm*—Roger K. Graham

[57] ABSTRACT

By addition of methacrylate/unsaturated acid and/or vinyl amide copolymers, poly(vinyl alcohol) can be melt-processed and co-extruded with structural polymers like poly(ethylene terephthalate) to form multi-layer films and objects with good adhesion between the components and good barrier properties. The films and objects can be separated and re-used by dissolution in water of the poly(vinyl alcohol)/methacrylate polymer blends and recovery of the structural polymer.

6 Claims, No Drawings

HIGH GAS BARRIER CO-EXTRUDED MULTIPLAYER FILMS

FIELD OF THE INVENTION

This invention relates to melt-processable thermoplastic blends of polymers containing a high percentage of vinyl alcohol units blended with certain copolymers of alkyl methacrylates with unsaturated organic acids, such as methacrylic acid, and/or vinyl amides, such as N-vinyl pyrrolidone, which blends are then co-extruded with structural polymers, such as poly(ethylene terephthalate), poly(vinyl chloride), polyolefins, polyamides, polycarbonates, polyglutarimides, polymers and copolymers of methyl methacrylate, and the like. Such co-extrudates may be processed to form laminar sheet, film, or other formed articles which exhibit a useful balance of barrier and strength properties, such as good resistance to permeation of gases, low moisture absorptivity, and toughness/modulus balance adequate for packaging uses.

The invention further relates to the co-extrusion process for forming these multi-layer composites. It further relates to a process for placing the structural polymer in a form to be recycled by ready separation of the laminates by aqueous dissolution of the poly(vinyl alcohol/-/methacrylate copolymer) blends, followed by re-processing of the purified structural polymer.

BACKGROUND OF THE INVENTION

Of all the synthetic polymers considered as materials with useful gas permeation properties, such as resistance to passage of oxygen, carbon dioxide, water, and the like, poly(vinyl alcohol) (PVOH), which is a polymer made up of units of the structure

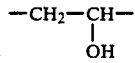

and generally prepared by the total hydrolysis of homopolymers of vinyl acetate or related vinyl esters, the starting polymer made up of units of the structure

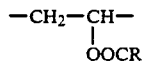

where R is alkyl, that is, from one to eight carbon atoms, preferably methyl, ranks as the most impervious to the passage of small molecules. PVOH derives this property from the high cohesive energy density and polarity of the hydroxyl groups. The presence of the network of hydroxyl groups has the concomitant effect of rendering the polymer (PVOH) impermeable to gases, but sensitive to moisture. The strong intermolecular interaction resulting from the high polarity of the —OH functional group gives rise to a melting temperature in the vicinity of the degradation temperature of PVOH. Consequently, melting is accompanied by degradation. The degration is so severe that PVOH by itself cannot either be melt extruded or injection molded. Co-polymers having a low mol percentage of ethylene, such as from about 5 to about 25 mol percent, are similar to poly(vinyl alcohol) in that they cannot be melt-processed into film without the aid of plasticizers.

In U.S. patent application Ser. No. 07/781,715, filed Oct. 22, 1991, now U.S. Pat. No. 5,189,097, now also European Patent Application 91-311265, filed Dec. 4, 1991, which has some of the same inventors and the same assignment as the present application, are disclosed additive polymers useful in allowing melt processing of the poly(vinyl alcohol) materials discussed above without significant alteration of their physical and barrier properties. These additive polymers are copolymers of lower alkyl methacrylates with a variety of nitrogenous monomers, especially those bearing amide groups, and most especially N-vinylpyrrolidone. Further is disclosed as more useful additives terpolymers containing lower alkyl methacrylates, the same nitrogenous co-monomers, and copolymerized unsaturated carboxylic acids, such as methacrylic acid. It is further disclosed that these latter terpolymers form segmented copolymers on blending with the poly(vinyl alcohol) matrix polymers.

In a patent application in the U.S. Ser. No. 07/872,478, filed on Apr. 23, 1992, abandoned, and in a continuation-in-part of said application, U.S. Ser. No. 07/988,548, filed Dec. 10, 1992, also with some of the same inventors. copolymers of lower alkyl methacrylates with unsaturated carboxylic acids, such as copolymers of methyl methacrylate with methacrylic acid, are also useful for the same purposes.

What has been discovered in the present invention is that these blends of poly(vinyl alcohol) with lower alkyl methacrylate copolymers, with at least one of copolymerized acid or amide, especially cyclic amide, functionality, when co-extruded with structural polymers, produce co-laminates of excellent physical, optical and barrier properties, which do not need additional adhesives to prevent delamination, and which further lend themselves readily to recovery of the structural polymer components of the laminate in a purified form which allows ready recycling, by such means as direct re-use of the film or sheet (if its integrity has been maintained), or by re-processing of comminuted powder, or conversion of the structural polymer into "monomeric" fragments which can be re-polymerized into useful polymers.

In the applications noted above, Applicants had found that a polymeric blend comprising from about 50 to about 90 parts of a first polymer containing at least 50 mol % of units of the structure

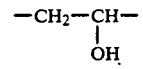

and optionally units of the structure

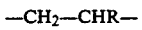

where R is H or —CH$_3$, and from 10 to about 50 parts by weight of a polymer containing from about 70 to about 98 parts of units derived from a lower alkyl methacrylate, and at least one of either up to about 30 parts of units derived from a vinyl or vinylidene monomer containing a cyclic amide group of units of the structure

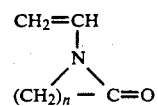

where n is 2, 3, 4, or 5, or up to about (30) parts of units derived from an unsaturated carboxylic acid or anhydride, may be melt-processed into useful objects such as sheet, film, and fiber. Applicants further had found that blending of the two polymers by melt-mixing will form a segmented melt-processable polymer wherein the two polymers are chemically combined to form a graft copolymer. Applicants had further described the co-extrusion of the blended polymer with another film-forming polymer to form a co-laminate, and the ability to separate the laminate by contacting with water.

The present invention relates to the specific combination of these blends with certain structural polymers to form a multilayer composite structure by co-extrusion or other process where the poly(vinyl alcohol) is melt-processed into a film or sheet, the multilayer laminates having good barrier properties and other physical properties attractive for processing and packaging, and to a process for readily recovering the structural polymers in a form from which various recycling routes may be chosen, depending on the nature of the structural polymer. Since an ability to recycle plastic waste is critical to solution of our waste management problems, and since purity of the recyclable waste stream, whether to reprocess into packaging material, to process for other plastics uses, or to depolymerize the polymer into useful small molecules, is critical to recycling, the present invention offers a convenient method, which further uses poly(vinyl alcohol), a polymer of outstanding barrier properties and adhesion in multi-layer structures.

DETAILED DESCRIPTION OF THE INVENTION

The blends of the vinyl alcohol polymers and the (meth)acrylate/unsaturated acid and/or vinyl amide co- or terpolymers may be formed into useful objects by many techniques, including casting from solution, compression molding of powder blends, formation of films and sheets from mixtures of latices and water-soluble polymers, extrusion of melt blends, and the like. The present invention relates to melt-processing and co-extrusion with a structural polymer into a multi-layer composite which may be readily re-cycled.

By melt-processable is meant that the polymer or blend can be converted from a solid form such as pellets, powder, and the like into a viscoelastic melt within an extruder or other heating/mixing device, that the melt is thermally stable enough to resist thermal degradation, and that the melt can be processed by extrusion, calendering, laminating, molding and the like into useful objects. The melt will neither be so liquid that it cannot be contained within the extruder or cannot be issued from the extruder in solid form, nor will it be so viscous that the extruder is incapable of processing it without damage to the equipment, nor will it be so thermally unstable that degradation will spoil the appearance or physical properties of objects processed from the melt. Further, the melt and resulting extrudate must be uniform in appearance.

The first polymer of the blend, which we shall designate PVOH, is a homopolymer or a copolymer of "vinyl alcohol" and a vinyl ester. Vinyl alcohol does not exist in monomeric form, and polymers containing such units must perforce be derived by chemical alteration of polymers derived from another monomer. The most common means of preparing such polymers is to polymerize a vinyl ester, such as vinyl formate, vinyl acetate, and the like of the structure

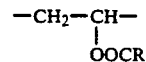

where R is H or —(CH$_2$)$_m$—CH$_3$, where m is from 0 to 7. Especially preferred is vinyl acetate, where R is methyl. Such polymers may be almost completely saponified or hydrolyzed to form polymers of greater than 99 mol % "vinyl alcohol". A small number of repeat units of the structure

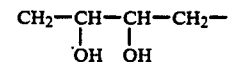

may be present. By controlling the conditions of hydrolysis or saponification, copolymers of the vinyl ester and vinyl alcohol may be formed. A range of such compositions are commercially available. The range of from about 50 mol % to about 100 mol % of vinyl alcohol is encompassed in the invention, but highly preferred are those polymers containing at least about 80 mol % vinyl alcohol. Other co-monomers may be present in the first polymer, but at low molar levels, such as below about 25 mol %, preferably below about 10 mol %, Such co-monomers may include (meth)acrylic esters, such as alkyl esters, such as ethyl acrylate, butyl methacrylate, and the like, hydroxyalkyl (meth)acrylates, such as beta-hydroxyethyl methacrylate, and the like, alkyleneoxy esters of (meth)acrylic acid, olefins, such as ethylene, propylene, butene-1 and the like, vinyl halides, such as vinyl chloride, N-vinyllactams, maleic anhydride, dialkyl maleates, dialkyl fumarates, and the like. Most commercial copolymers of ethylene and vinyl alcohol, having a relatively low mol % of vinyl alcohol content and diminished barrier properties, are unsuitable for the purposes of the present invention; however, copolymers of from about 5 to about 25 mol percent ethylene, preferably from about 5 to about 15 mol percent, may be melt-processed when blended with the copolymers of lower alkyl (meth)acrylates disclosed herein.

The partially or totally hydrolyzed PVOH employed in this invention possess a molecular weight (weight average) between 13,000 and 186,000, although higher and lower molecular weight polymers may be used. The viscosity of these two ranges of average molecular weights may also be measured in solution, and will vary from 3-50 cPs (4% aqueous solutions, 20° C.) for the commercial materials, preferably between 22-26 cPs. If PVOH of a lower degree of saponification (50-87 mol %) is utilized, the PVOH polymer may be of higher molecular weight.

The first polymer may also contain units derived from alkyleneoxy (meth)acrylates, such as are described in U.S. Pat. No. 4,618,648, incorporated herein by reference. Such alkyleneoxy (meth)acrylates are esters of (meth)acrylic acid having as the "alcohol" portion oligomers of —CH$_2$—CHY—O— units, where Y is hydrogen or methyl, and are derived from oligomerization of ethylene and/or propylene oxide. They may be terminated at one end by alkyl, aryl, or alkaryl groups, such as C$_1$-C$_{20}$ alkyl, C$_6$ aryl or C$_7$-C$_{20}$ alkaryl group.

The second component of the melt-processable blend is a polymer which is a copolymer of from about 70 to 98 parts of a C$_1$ to C$_4$ alkyl ester of acrylic or methacrylic acid, preferably the C$_1$ ester of methacrylic acid, which is methyl methacrylate, with either up to about 30 parts of a vinyl or vinylidene monomer with amide units, preferably cyclic amide units, and/or of one or more copolymerizable unsaturated acids.

The cyclic amide units relate to monomers of the structure

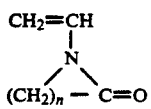

where n is 2,3, or 4. Such monomers include N-vinylpropiolactam, N-vinylpyrrolidone (otherwise known as N-vinylbutyrolactam), and N-vinylcaprolactam. Preferred is the lactam wherein n=3, which is N-vinylpyrrolidone (NVP), for reasons of commerical availability. Methyl methacrylate (MMA) is preferred because it endows the copolymer with a higher service temperature and a higher degree of polarity for best compatibility with the PVOH.

The vinyl cyclic amides may be replaced in part or completely by other vinyl or vinylidene monomers containing amide groups or other groups having the structure —NH—C(O)—, such as vinyl acetamide, N-methyl (meth)acrylamide, ureidoethylethyl (meth)acrylate, and the like.

It is preferred that the second copolymer further contain from about 1 to about 20 parts, preferably from about 2 to about 10 parts of units derived from at least one copolymerizable unsaturated acid. Contemplated are acids such as carboxylic acids, sulfonic acids, phosphonic acids, and the like, such as those incorporated from monomers such as p-vinylbenzene-sulfonic acid, beta-methacryloxyethylphosphonic acid, methacrylic acid, and the like. Preferred for ease of incorporation are acids such as methacrylic acid, acrylic acid, itaconic acid, maleic acid, fumaric acid, acryloxypropionic acid, and the like. Anhydride units, such as from maleic anhydride, may also be present.

A preferred blend composition comprises
a) from above about 50 to about 90 parts, more preferably about 70 to about 90 parts, of the first polymer wherein the first polymer contains more than about 85 mole percent of units of the "vinyl alcohol" structure and less than about 15 mol percent of units of the structures with ester units, such as residual units derived from vinyl acetate.
b) from about 10 to below about 50 parts, more preferably about 10 to about 30 parts, of the second polymer containing from about 5 to about 28 parts of units derived from vinyl pyrrolidone, from about 70 to about 93 parts of units derived from methyl methacrylate, and from about 2 to about 5 parts of a copolymerizable unsaturated acid wherein the acid is methacrylic acid, acrylic acid, itaconic acid, maleic acid, fumaric acid, acryloxypropionic acid, or alpha-methylene-delta-methylglutaric acid. Of the acids, especially preferred for cost and ease of incorporation, is methacrylic acid. Other monomers may be copolymerized with those listed above which comprise the second copolymer, as long as they do not adversely affect either the copolymerization behavior, the processing of the blends, or the physical properties of the blend. Such monomers include up to about 10 parts of vinyl esters, such as vinyl acetate, vinyl aromatics, such as styrene, other esters of (meth)acrylic acid, such as glycidyl methacrylate, 2-ethylhexyl acrylate, and the like, (meth)acrylonitrile, and the like.

The polymeric components of the melt-processable blend may be prepared by well-known methods or in the case of the poly(vinyl alcohol), may be obtained commercially. Preparation of the (meth)acrylic co- and terpolymers may best be accomplished by emulsion polymerization and isolation from the emulsion by spraydrying, coagulation, and the like. The weight-average molecular weight of the second polymer may vary from about 10,000 to about 500,000; preferred for ease of processing, thermal stability, and rheological properties is from about 100,000 to about 200,000. However, when the second polymer contains units derived from an unsaturated acid and when the first polymer is of relatively high molecular weight, such as above 1,000,000, the preferred molecular weight range of the second polymer is from about 200, that is, oligomeric to about 100,000. By following the experimental procedures described below, the skilled practitioner can readily determine if appropriate melt strength has been achieved without raising the melt viscosity to the extent that processing and extrusion are difficult.

It is believed that when the acid group is present in the second copolymer that a chemical reaction occurs on blending and heating with the poly(vinyl alcohol) to produce a segmented copolymer of the structure described above. It is to be understood that the polymeric blend terminology encompasses any segmented copolymers formed during the various thermal processing steps. The extent of grafting may be enhanced by the presence of catalysts for esterification reactions between acid or anhydride groups and alcohol groups, such as acids, bases, organotin compounds, organotitanium catalysts, and the like. The esterification reaction may be enhanced also by removal of water formed during the grafting reaction, such as by vacuum application to the reactor, such as a vacuum vent on the extruder.

A compositional range of from above about 50 to about 90 parts of the first polymer and correspondingly from about 10 parts to below about 50 parts of the second polymer is contemplated. In general, the lower the level of the second polymer required to achieve melt processability, the better will desirable PVOH properties, such as oxygen barrier, be maintained. The presence in the second polymer of units derived from an unsaturated copolymerizable acid broadens the range of compositions which are useful in achieving the improvements desired in the processing and properties of the first polymer.

Blending of the two copolymers may be carried out most conveniently by dry mixing the finely granulated polymer particles prior to melt compounding in a single- or twin-screw extruder. In the process of dry blending, small quantities of additives may be added to the mixture of particulates for the purpose of improving the physical properties of the blend. Examples of additives may include one or more of the following classes of compounds: antioxidants, ultraviolet light absorbers, plasticizers, antistatic agent, slip agents, coloring agents, fillers and other compounds. Further, fugitive plasticizers, such as water in amounts about 3%, may be added to aid in compounding and processing the blend.

Once the blends of the poly(vinyl alcohol) and the (meth)acrylic copolymer or terpolymer have been prepared, it remains to fabricate them with appropriate structural polymers into multilayer composites. Although the films or sheets may be separately prepared, stacked, and laminated, due to the good adhesive properties of the blend, it is economically more attractive to use appropriate co-extrusion features to form multilayer sheets, film, or formed objects, such as bottles. By sheet is meant a single layer of a polymer of thickness >10 mils or >0.254 mm. By film is meant a single layer of thickness equal to or less then 10 mils, and thicker than about 0.5 mil (0.0127 mm).

For example, a blend of a 3:1 methyl methacrylate/N-vinylpyrrolidone copolymer in a 50/50 admixture with poly(vinyl alcohol) may be co-extruded with such structural polymers as poly(ethylene terephthalate) (PET), with poly(methyl methacrylate), with poly(vinyl chloride), or with polycarbonate, to form continuous laminated film with good adhesion between the layers. The structural polymer is at the outside of the composite, although of course it may be one or more of the internal layers in a composite of five or more layers, for reasons to insure good surface toughness and hardness. The film or sheet from the blend imparts improved barrier properties and acts as an adhesive.

The co-extruded film or sheet with PET or other structural polymer can be thermoformed into useful objects without delamination. The blend may be varied through other compositional ratios, such as 60//40 or 80//20, and other combinations of copolymer, poly(vinyl alcohol) and structural polymers.

The co-extruder composites of the present invention may be oriented, either monoaxially or preferably biaxially. Some orientation will occur in certain processes such as stretch-oriented blow molding, or in thermoforming of sheet. In other cases, biaxial orientation may be applied after the multilayer film or sheet has been co-extruded and while it is still in a semi-molten state. Appropriate equipment for such biaxial orientation is well-known to the film manufacturing industry.

A great advantage for these multi-layer composites is that the barrier film or sheet of poly(vinyl alcohol) can be dissolved when the surface is in contact with water, especially warm water. (By "dissolve", we mean that the poly(vinyl alcohol) component, along with any grafted poly(methacrylate) chains, truly goes into aqueous solution, while any free methacrylic polymer, although not dissolved, has no structural integrity and will disperse in the aqueous layer.) After dissolution of the poly(vinyl alcohol), the remaining structural polymer can be recovered in a pure form for recycling.

Recycling of the poly(vinyl alcohol) can also be accomplished by evaporation of the wash water, which should recover both the poly(vinyl alcohol) and the acrylic additive polymer in a well-mixed state for further melt processing.

Although it is possible to separate the polymers when the article is still intact, it is better, because of exposure of much more surface, to grind or comminute the article to a powder prior to contacting with water. Thus, the invention contemplates a process for recycling the multi-layer composite articles described above by:
a) contacting the article, optionally in ground or comminuted form, with water until the polymeric blend layer has essentially dissolved and the multi-layer composite has separated into single layers of structural polymer components;
b) washing the remaining structural polymer components to remove residue of the polymeric blend;
c) further reprocessing the structural polymer by melting and re-extruding into a structural polymer film or sheet, or melting and re-processing into a molded or extruded article, or, when the structural polymer can be hydrolyzed or pyrolyzed cleanly, such as with poly(ethylene terephthalate) or poly(methyl methacrylate), but not poly(vinyl chloride), further reprocessing the structural polymer by hydrolyzing and/or pyrolyzing the structural polymer into low molecular components useful in polymerization reactions. More particularly, the invention contemplates the process wherein the structural polymer is a polyester and wherein hydrolyzing and/or pyrolyzing the structural polymer results in glycol, acid, or ester components useful in polyesterification reactions.

EXAMPLES

The following examples will illustrate the properties of the blend compositions. All compositions referred to in the examples are in weight percent or parts by weight unless otherwise specified. All compositions of the following examples were dry blended to yield homogeneous mixtures of finely divided particulates. In each case the mixture of fine white powder was melt compounded in a single screw Killion Extruder at temperatures ranging from 204°-222° C. and a screw speed of 80 rpm.

The test method used in the evaluation of the rheological characteristics of the base polymer and the blends is ASTM D3835-79, which provides the necessary correlation between actual processing conditions and the test conditions. The melt viscosity of the base resin, PVOH, is inadequate for such thermal processing applications as extrusion blow molding, coextrusion, thermoforming etc. To adequately satisfy the processing requirements, the resin should exhibit a non-Newtonian response, i.e. having a low viscosity under high shear conditions such as those encountered during extrusion and a high viscosity under the low shear conditions experienced by blow molded parisons and thermoformed articles. Consequently, the test method evaluates the thermal, rheological and shear stability of the molten polymer. The melt viscosity of the base polymers and blends was measured under the same temperatures and piston speed set conditions. Under a given set of shear rates, the viscosity of the base polymer, PVOH, is lower than that of the alloys.

The particular materials used in the examples were as follows:

a) PVOH-1 (from Air Products, commercially designated AIRVOL® 107) is a fully hydrolyzed (98-99 mol %) resin having a Mw of 31,000-50,000 (manufacturer's data). PVOH-2 (from Air Products, commercially designated AIRVOL® 205, is a partially hydrolyzed (87-89 mol %) PVOH resin possessing a similar molecular weight.

In the examples and tables, MMA is methyl methacrylate, NVP is N-vinylpyrrolidone, and MAA is methacrylic acid. The acrylic copolymers (MMA-NVP or MMA-NVP-MAA or MMA-MAA) were prepared from commercially avialable MMA, MAA, and NVP monomers by emulsion polymerization and isolated by coagulation or freeze drying technique. The particular copolymers described in the examples may contain from 0-25 weight percent of NVP and 0-25 weight percent MAA, the balance being MMA. The presence of MAA has little effect on the polymerization reaction.

EXAMPLE 1

This example teaches the general method for preparing copolymers of methyl methacrylate and N-vinyl pyrrolidone. A copolymer comprising 25 weight percent of NVP and the remainder MMA was prepared by an emulsion polymerization technique as follows: A monomer mixture (Mix M) was prepared, having methyl methacrylate:N-vinyl pyrrolidone ratio of 75:25. The mixture contained 4237.5 grams of MMA, 1412.5 grams of NVP, 16.95 grams of N-dodecyl mercaptan, 3333.74 grams of deionized water and 105.94 grams of a 10% aqueous sodium dodecylbenzene sulfonate solution. Each monomer mixture was polymerized according to the following procedure. To an appropriate glass vessel equipped with stirrer, heater, a reflux condenser, and nitrogen sparge tube, was added 7467.57 grams of deionized water, and 2.52 grams of sodium carbonate. The mixture was sparged for one hour with nitrogen while heating to 70° C. The sparge was then changed to a sweep and 317.81 grams of a 10% aqueous solution of sodium dodecylbenzene sulfonate was added to the mixture. The temperature of the reaction vessel was then raised to 85° C. At this temperature, 124.96 mL of the initiator mixture (Mix I, which consisted of 5.65 grams of sodium persulfate and 1618.86 grams of deionized water) was added to the reaction vessel. The monomer mixture (Mix M) was then fed into the reaction vessel over a time period of three hours.

As the polymerization proceeded, the initiator mixture was added to the reaction vessel at the rate of 124.96 mL every 15 minutes. The accumulation of solids was measured every 60 minutes just before the addition of the initiator mixture. At the completion of the initiator and monomer addition the mixture was held at 85° C. for one hour. The mixture was then cooled, filtered and the polymer isolated by freeze-drying. The initiator may also be added gradually throughout the reaction, with equivalent results.

EXAMPLES 2–7

The following examples (Table I) illustrate blends prepared from different PVOH and MMA/NVP polymers. Mixtures were prepared by dry-blending in a polyethylene bag to yield a mixture of a 80:20% weight ratio of PVOH to methyl methacrylate-co-N-vinyl pyrrolidone copolymer. The mixture was fed into the hopper of a single screw Killion extruder in which the mixture was melt compounded and extruded to form pellets at the following extrusion conditions: Extruder barrel temperatures: Zone-1: 204° C., Zone-2: 210° C., Zone-3: 216° C.; Die temperatures: die-1: 218° C., die-2: 221° C.; screw speed=80 rpm.

EXAMPLE 8

This example teaches the general method for preparing terpolymers of methyl methacrylate, N-vinyl pyrrolidone, and methacrylic acid. A terpolymer comprising 25 weight percent of NVP, 1 weight percent methacrylic acid (MAA), and the remainder MMA was prepared by an emulsion polymerization technique as follows: A monomer mixture was prepared, having methyl methacrylate:N-vinyl pyrrolidone:methacrylic acid ratio of 74:25:1. The mixture contained 4181 grams of MMA, 1412.5 grams of NVP, 56.5 grams of MMA, 67.8 grams of N-dodecyl mercaptan, 3363.4 grams of deionized water and 105.94 grams of a 10% aqueous sodium dodecylbenzene sulfonate solution. Each monomer mixture was polymerized according to the following procedure. To an appropriate glass vessel equipped with stirrer, heater, a reflux condenser, and nitrogen sparge tube, was added 7534.01 grams of deionized water, and 2.52 grams of sodium carbonate. The mixture was sparged for one hour with nitrogen while heating to 70° C. The sparge rate was then changed to a sweep and 317.81 grams of a 10% aqueous solution of sodium dodecylbenzene sulfonate was added to the mixture. The temperature of the reaction vessel was then raised to 85° C. At this temperature, 126.07 mL of the initiator mixture, which consisted of 5.65 grams of sodium persulfate and 1633.27 grams of deionized water, was added to the reaction vessel. The monomer mixture was then fed into the reaction vessel over a three-hour period.

As the polymerization proceeded, the initiator mixture was added to the reaction vessel at the rate of 126.07 mL every 15 minutes. The accumulation of solids was measured every 30 minutes just before the addition of the initiator mixture. At the completion of the initiator and monomer addition the mixture was held at 85° C. for one hour. The mixture was then cooled, filtered and the polymer isolated by coagulation with a 2% solution of magnesium acetate. The polymer was dried in a vacuum oven prior to blending experiments. The molecular weight of this polymer was about 50,000.

In a similar manner, many polymers of alkyl (meth)acrylates, unsaturated lactams or amides, and unsaturated acids may be prepared.

EXAMPLE 9

This example teaches the general method for preparing copolymers of methyl methacrylate and methacrylic acid also useful in the present invention as a component of blends with poly(vinyl alcohol). A copolymer comprising 15 weight percent methacrylic acid (MAA), and the remainder methyl methacrylate (MMA) was prepared by an emulsion polymerization technique as follows: A monomer mixture was prepared, which contained 1122 grams of MMA, 198 grams of MAA, 10.56 grams of N-dodecyl mercaptan, 782.71 grams of deionized water and 24.75 grams of a 10% aqueous sodium dodecylbenzene sulfonate solution. To an appropriate glass vessel equipped with stirrer, heater, a reflux condenser, and nitrogen sparge tube, was added 1753.26 grams of deionized water, and 0.59 grams of sodium carbonate. The mixture was sparged for one hour with nitrogen while heating to 70° C. The sparge rate was then changed to a sweep and 74.25 grams of a 10% aqueous solution of sodium dodecylbenzene sulfonate was added to the mixture. The temperature of the reaction vessel was then raised to 85° C.

At this temperature, 29.343 grams of the initiator mixture, which consisted of 1.32 grams of sodium persulfate and 380.08 grams of deionized water, was added to the reaction vessel, along with 31.42 mL of rinse water. The monomer mixture was then fed into the reaction vessel over a three-hour period.

As the polymerization proceeded, the initiator mixture was added to the reaction vessel at the rate of 29.34 mL every 15 minutes. The accumulation of solids was measured every 30 minutes just before the addition of the initiator mixture. At the completion of the initiator and monomer addition, followed by a 31.42 mL water rinse of each feed line, the mixture was held at 85° C. for one hour. The mixture was then cooled, filtered and the polymer isolated by freeze-drying. The polymer was dried in a vacuum oven prior to blending experiments. The molecular weight of this polymer was about 80,000.

In a similar manner, other polymers of controlled molecular weight of alkyl (meth)acrylates, vinyl amides, and unsaturated acids may be prepared and isolated, such as: MMA/NVP/methacrylic acid=94/5/1; MMA/NVP/methacrylic acid=90/5/5; MMA/NVP/methacrylic acid=90/9/1; MMA/NVP/methacrylic acid=79/20/1; MMA/NVP/acrylic acid=94/5/1; MMA/NVP/acryloxypropionic acid=90/5/5; MMA/butyl/acrylate/vinyl acetamide/glycidyl methacrylate=48/40/10/2; MMA/ethyl acrylate/acrylamide/maleic anhydride=20/74/5/1.

EXAMPLE 10

This example describes co-injection stretch blow molding experiments, which were carried out as follows: a) Resin A (structural polymer), in this case poly-(ethylene terephthalate) (PET), was injected from an extruder into a vertically mounted mold; b) Resin B (Barrier Layer) was then injected concentrically and circularly into the mold cavity; c) The parison, thus formed, was rotated to a conditioning pot where it was conditioned at a temperature of 230° C. for 10 seconds; d) Conditioning was followed by simultaneous stretching and blowing of the parison into an 8-ounce (236.6 ml.) bottle.

In the following example, the additive polymer is poly(methyl methacrylate)/N-vinylpyrrolidone 75/25; the poly(vinyl alcohol is Airvol® 205, a partially hydrolyzed (87–89% vinyl alcohol units) poly(vinyl alcohol) from poly(vinyl acetate), with a molecular weight of 31,000–50,000 (manufacturer's data). The blend was at a PVOH 4//(additive) 1 ratio.

TABLE 1

Processing Conditions for the Co-injection Molding of PET with a PVOH//p(MMA/NVP) Blend.

| Items | Units | PET | PET//PVOH/Additive |
|---|---|---|---|
| Cylinder: | | | |
| C1 | °C. | 250 | 200 |
| C1 | °C. | 270 | 200 |
| C1 | °C. | 270 | 200 |
| Nozzle Temp. C1 | °C. | 270 | 220 |
| Shot Size | cc/sec | 30 | 6 |
| Injection Pressure | kg/cm² | 150,40,35 | 145,110,115 |
| Velocity | cc/sec. | 13,13,13 | 45,45,45 |
| Injection Time | sec. | 6.3 | 6.0 |
| Cooling Time | sec. | 6.0 | 6.0 |
| Cavity Temp. | °C. | 60.0 | 60.0 |
| Cycle Time | sec. | 29.3 | 29.3 |
| Pot Temp. | °C. | 230.0 | 230.0 |

Wall sections of co-injection blow molded multilayer 8-ounce bottles and one monolithic PET 8-ounce bottle were thick sectioned at room temperature and evaluated by light microscopy (LM) and SEM for uniformity in the thickness of the layers comprising the composite and the apparent strength of adhesion at the interface. It was found that the apparent interfacial adhesion of the PET//(PVOH/acrylic additive) blend//PET composite was superior to that of adherence with such barrier layers as meta-xylenediamine polyadipamide and ethylene/vinyl alcohol 32/68.

Comparison of the Oxygen Permeability Measurements of Monolithic and multilayer PET 8-ounce Bottles.

| COMPOSITION | PERMEABILITY (cc/Pack/Day) |
|---|---|
| PET | 0.0253 |
| PET/(PVOH//acrylic copolymer)/ PET (A) | 0.0153 |

(A) Thickness (nominal): 233//76//467 mm.

EXAMPLE 11

This example illustrates preparation of ternary multilayer sheet composites. The coextrusion was carried out with the aid of a simple feed block design. In this design a second melt stream is introduced from an extruder which is mounted perpendicular to a main or central extruder such that the melted polymer emitting from the central extruder becomes encapsulated by the melt from the second extruder. Because of the drastic difference in the thermal and rheological characteristics of the substrate (PET) and core layer P(MMA-NVP-MAA)/PVOH alloy, care was taken in selecting the respective extruder screws. The screw designs chosen were as follows: 1) Extruder one was equipped with a single stage metering type screw, the metering section being 30% of the total length of the screw; 2) Extruder two was fitted with a two stage mixing and plastication screw. The latter screw was chosen in order to facilitate the melting and homogenizing of the partially crystalline PET resin. The former screw configuration enabled the P(MMA-NVP-MAA)/PVOH alloy to attain the necessary melt consistency without the occurrence of severe degradation due to processing.

The coextrusion conditions were as follows:
Extruder-1:
Barrel Temperature:
 Zone-1=177° C.
 Zone-2=193° C.
 Zone-3=193° C.
Die Temperature:
 Die-1=214° C.
 Die Block=205° C.
Extruder-2:
Barrel Temperature:
 Zone-1=204° C.
 Zone-2=219° C.
 Zone-3=224° C.
Die Temperature:
 Die-1=232° C.
 Die Block=216° C.

In order to evaluate the gas permeability of binary blends in the system PVOH/P(MMA-NVP-MAA) at ambient temperature, pressure and 0 and 80% relative humidity (R.H), samples were prepared from melt blends of fully hydrolyzed (98–98.8%, MW 31,000–50,000, manufacturer's specifications) (AIRVOL® 107) and partially hydrolyzed (AIRVOL® 205) PVOH, described in Example 1, with various acrylic terpolymers of chemical composition P(MMA-NVP-MAA). The alloys derived from melt compounding were extruded into 3 to 5 mils (0.08 to 0.13 mm) thick sheets. A number of the samples were also coextruded with PET to form composites of the following morphology: PET//(PVOH/P(MMA-NVP-MAA))//PET. The data are presented below.

The sheet extrusion experiment was executed on a single screw Killion extruder equipped with a sheet die and a two stage screw for mixing and homogenizing of the alloys. The multilayer composites were prepared by coextrusion with a modular feed block design arrangement. In this design a second melt stream was introduced from an extruder which is mounted perpendicular to a main or central extruder such that the melted polymer emitting from the central extruder becomes encapsulated by the melt from the second extruder. Because of the drastic difference in the thermal and rheological characteristics of the substrate (PET) and core layer P(MMA-NVP-MAA)/PVOH alloy, care was taken in selecting the respective extruder screws. The screw designs chosen were as follows: 1) Extruder ONE was equipped with a single stage metering type screw, the metering section being 30% of the total length of the screw; 2) Extruder TWO was fitted with a two stage mixing and plastication screw. The latter screw was chosen in order to facilitate the melting and homogenizing of the partially crystalline PET resin.

The former screw configuration enabled the (MMA-NVP-MAA)/PVOH alloy to attain the necessary melt consistency without the occurrence of severe degradation due to shear heating.

Both the PET homopolymer and the 'barrier' alloy were thoroughly dried before being fed into the hopper of the respective extruders, to prevent undue degradation of the viscosity and the concomitant loss of favorable physical properties. PET was dried at 120° C. in a vacuum oven. The alloy was also dried at 80° C. in a vacuum oven. The thickness of the core layer was varied from 1.5 to 5 mils (0.04 to 0.13 mm), whereas the substrate or skin layers were varied from 3 to 14 mils (0.08 to 0.36 mm) in thickness.

In the table are listed the measurements of the $O_2$ gas permeability of the PET substrate layer and the respective multilayer composites. As is expected the gas permeability of the PET substrate layer is significantly higher than that of the composites.

The composites comprising of PET and the PVOH-/Acrylic Polymer alloys show negligible change in $O_2$ gas permeability with increased percent R.H. It is well known that PET and other polyesters show modest improvement in $O_2$ permeability when exposed to high relative humidity conditions. Hence, the small change in $O_2$ permeability with % R.H may be a direct consequence of the efficacy of the PET substrate layers in isolating and shielding the PVOH/Acrylic co-/terpolymer barrier layer from the deleterious effect of moisture. Additional measurements of the $O_2$ permeability of these and similar multilayer composites were carried out at various relative humidity conditions to assess the effect of moisture on the $O_2$ barrier property of the composites. Change is defined as $$\frac{\text{Perm. (80\% RH)} - \text{Perm. (0\% RH)}}{\text{Perm. (0\% RH)}}$$

| EX. | COMPOSITION | Perm.* (0% R.H) | Perm.* (80% R.H) | CHANGE |
|---|---|---|---|---|
| | Oxygen Permeability of PVOH/Acrylic Terpolymer Alloys at 0 and 80% Relative Humidity. | | | |
| 1. | AIRVOL ® 107/P(MMA-NVP-MAA = 70/25/05)(80/20) blend | 0.012 | 0.023 | 0.92 |
| 2. | AIRVOL ® 205/P(MMA-NVP-MAA = 74/25/01)(90/10) blend | 0.009 | | |
| 3. | AIRVOL ® 205/P(MMA-NVP-MAA = 72/25/03)(90/10) blend | 0.011 | 0.115 | 9.45 |
| 4. | AIRVOL ® 205/P(MMA-NVP-MAA = 72/25/03)(80/20) blend | 0.070 | 0.122 | 0.74 |
| 5. | AIRVOL ® 205/P(MMA-NVP-MAA = 70/25/05)(90/10) blend | 0.081 | 0.136 | 0.68 |
| 6. | AIRVOL ® 205/P(MMA-NVP-MAA = 70/25/05)(80/20) blend | 0.129 | 0.130 | 0.01 |
| 7. | AIRVOL ® 205/P(MMA-NVP-MAA = 68/25/07)(90/10) blend | 0.085 | 0.134 | 0.58 |
| 8. | AIRVOL ® 205/P(MMA-NVP-MAA = 68/25/07)(80/20) blend | 0.167 | 0.176 | 0.05 |
| 9. | AIRVOL ® 205/P(MMA-NVP-MAA = 75/25/00)(80/20 blend | 0.009 | 0.150 | 15.6 |
| 10. | PET | 9.539 | 8.552 | −0.1 |
| | Oxygen Permeability of Multilayer Composites at 0 and 80% R.H | | | |
| 2. | PET/(Blend 9.)/PET | 0.1535 | 0.1698 | |
| 3. | PET/(Blend 2.)/PET | 0.2206 | 0.3144 | |
| 4. | PET/(Blend 3.)/PET | 0.2959 | 0.2777 | |
| 5. | PET/(Blend 4.)/PET | 0.4212 | 0.4684 | |
| 6. | PET/(Blend 5.)/PET | 0.3336 | 0.3258 | |
| 7 | PET/(Blend 7.)/PET | 0.3367 | 0.2684 | |

*cc. mil/(100 in² · Day · Atm.)

The above mentioned processing conditions were used in the fabrication of the following multilayer composites: PMMA/(AIRVOL-205:P(MMA-NVP=75/25)=1:1)/PMMA; PMMA/(AIRVOL-205:P(MMA-NVP=75/25)=3:2)/PMMA. All of the composites were clear in appearance. A PMMA/EVAL E/PMMA composite, where EVAL E is a commercial ethylene-vinyl alcohol copolymer of ca. 32 mol % ethylene content, showed evidence of poor interfacial adherence whereas the PMMA/(AIRVOL® 205:P(MMA-NVP=75/25)/PMMA composites showed evidence of remarkable interfacial polymer-polymer adherence and clarity.

Samples of nine co-extruded multilayer composites of varying thicknesses were analyzed for $O_2$ permeability at ambient conditions and after conditioning at 90% R.H. The observed values of the $O_2$ permeability under these two conditions are listed in below for comparison.

At ambient conditions the observed low O$_2$ permeability of the composites/PMMA//P(MMA-NVP=75/25:AIRVOL® 205)//PMMA, (the PMMA being a homopolymer of MW ca. 90,000) reflects the inherently low O$_2$ transmission rate of the P(MMA-NVP=75/25):AIRVOL® 205 barrier alloy. However, at high relative humidity (R.H) (90% R.H), the gas barrier property of the P(MMA-NVP=75/25):AIRVOL® 205 alloy is adversely affected by the high moisture content experienced by the inner layer of the ternary composite.

Oxygen Permeability of PMMA/(MMA-NVP = 75/25/PVOH)/PMMA Multilayer Composites at 0 and 90% R.H.

| EX. | COMPOSITE | THICKNESS MILS | PERM.* 0% R.H | PERM.* 90% R.H |
|---|---|---|---|---|
| 1. | PMMA/MMA-NVP/PVOH = 1:1/PMMA | 11.5 | 0.015 | 10.90 |
| 2. | PMMA/MMA-NVP/PVOH = 1:1/PMMA | 6.9 | 0.005 | 12.21 |
| 3. | PMMA/MMA-NVP/PVOH = 1:1/PMMA | 6.7 | 0.016 | 11.93 |
| 4. | PMMA/MMA-NVP/PVOH = 1:1/PMMA | 11.7 | 0.008 | 11.17 |
| 5. | PMMA/MMA-NVP/PVOH = 3:2/PMMA | 10.1 | 0.004 | 13.13 |
| 6. | PMMA/MMA-NVP/PVOH = 3:2/PMMA | 10.1 | 0.009 | 13.03 |
| 7. | PMMA/MMA-NVP/PVOH = 3:2/PMMA | 10.5 | 0.012 | 13.44 |
| 8. | PMMA/MMA-NVP/PVOH = 3:2/PMMA | 6.2 | 0.006 | 13.33 |
| 9. | PMMA/MMA-NVP/PVOH = 3:2/PMMA | 6.5 | 0.013 | 14.63 |

*cc. mil/100 in$^2$ · Day · Atm.
PVOH = AIRVOL® -205

EXAMPLE 12

The composite of Example 10 was granulated into flakes and treated with 8 parts of water per part of composite. After the passage of 15 minutes, the granules were fully de-laminated even at room temperature. 7.9 grams of PET were recovered. After washing with water, the chips were clear and transparent.

The extraction was conducted with and without stirring at both room temperature and at 65° C.; similar results were obtained.

We claim:

1. A multi-layer composite comprising alternating layers of:
   (a) a film or sheet of a structural polymer chosen from the group consisting of poly(vinyl chloride), a polyolefin, a polycarbonate, a polyglutarimide, a polymer of methyl methacrylate, a polyamide, or a polyester;
   (b) a film or sheet of a polymeric blend of:
      (i) from above about 50 to 90 parts by weight of a polymer containing at least 50 mol % of units of the structure

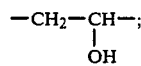

(ii) from 10 to below about 50 parts by weight of a polymer containing at least about 70 parts of units derived from a lower alkyl methacrylate, and at least one of either up to about 30 parts of units derived from from a vinyl or vinylidene monomer containing an amide group or up to about 30 parts of units derived from an unsaturated carboxylic acid or anhydride; the film or sheet of part (a) being the external layers.

2. A multi-layer composite comprising alternating layers of:
   (a) a film or sheet of a structural polymer chosen from the group consisting of poly(vinyl chloride), a polyolefin, a polycarbonate, a polyglutarimide, a polymer of methyl methacrylate, a polyamide, or a polyester.;
   (b) a film or sheet of a polymeric blend of:
      (i) from 70 to 90 parts by weight of a polymer containing at least 50 mol % of units of the structure

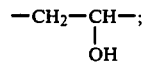

(ii) from 10 to 30 parts by weight of a polymer containing at least about 70 parts of units derived from a lower alkyl methacrylate, and at least one of either up to about 30 parts of units derived from a vinyl or vinylidene monomer containing an amide group or up to about 30 parts of units derived from an unsaturated carboxylic acid or anhydride; the film or sheet of part (a) being the external layers.

3. The multi-layer composite of claims 1 or 2 wherein the units derived from a lower alkyl methacrylate are units derived from methyl methacrylate and wherein the units derived from a vinyl or vinylidene monomer containing an amide group are units derived from N-vinylpyrrolidone.

4. The multi-layer composite of claims 1 or 2 wherein the composite is biaxially oriented.

5. The multi-layer composite of claim 3 wherein the polyester contains units derived from ethylene glycol and terephthalic acid.

6. The multi-layer composite of claim 5 wherein the polyester further contains units derived from cyclohexanedimethanol.

* * * * *